US012391902B2

(12) United States Patent
Berman et al.

(10) Patent No.: US 12,391,902 B2
(45) **Date of Patent: *Aug. 19, 2025**

(54) METHOD OF WASHING TEXTILE ARTICLES

(71) Applicant: Ecolab USA Inc., St. Paul, MN (US)

(72) Inventors: Russell Shawn Berman, Lithia, FL (US); Max Donald Harper, Knoxville, TN (US); Joel Monroe Madenwald, Columbus, OH (US); Carl Henry Mattson, Florence, NJ (US)

(73) Assignee: ECOLAB USA INC., St. Paul, MN (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/449,114

(22) Filed: Aug. 14, 2023

(65) Prior Publication Data

US 2024/0010956 A1 Jan. 11, 2024

Related U.S. Application Data

(63) Continuation of application No. 17/220,193, filed on Apr. 1, 2021, now Pat. No. 11,773,350, which is a continuation of application No. 16/280,249, filed on Feb. 20, 2019, now Pat. No. 10,995,305, which is a continuation of application No. 13/589,633, filed on Aug. 20, 2012, now Pat. No. 10,253,281.

(51) Int. Cl.
*C11D 3/395* (2006.01)
*C11D 3/39* (2006.01)

(52) U.S. Cl.
CPC .......... *C11D 3/3951* (2013.01); *C11D 3/3945* (2013.01); *C11D 3/3953* (2013.01); *C11D 3/3955* (2013.01); *C11D 2111/44* (2024.01)

(58) Field of Classification Search
CPC ... C11D 3/3951; C11D 3/3945; C11D 3/3953; C11D 3/3955; C11D 2111/44
See application file for complete search history.

(56) References Cited

U.S. PATENT DOCUMENTS

| | | | | |
|---|---|---|---|---|
| 3,664,961 | A | 5/1972 | Norris | |
| 3,937,737 | A | 2/1976 | Eiglmeier | |
| 3,946,057 | A | 3/1976 | Reedy | |
| 4,248,928 | A | 2/1981 | Spadini et al. | |
| 4,286,016 | A * | 8/1981 | Dimond | C11D 3/395 510/513 |
| 4,489,574 | A | 12/1984 | Spendel | |
| 4,618,914 | A | 10/1986 | Sato et al. | |
| 4,678,704 | A | 7/1987 | Fellows | |
| 4,830,773 | A | 5/1989 | Olson | |
| 5,141,803 | A | 8/1992 | Pregozen | |
| 5,221,496 | A | 6/1993 | Holland | |
| 5,306,444 | A | 4/1994 | Kitamura et al. | |
| 5,369,126 | A | 11/1994 | Doran et al. | |
| 5,454,237 | A | 10/1995 | Pellerin | |
| 5,739,094 | A | 4/1998 | Bowman et al. | |
| 5,763,412 | A * | 6/1998 | Khan | A01N 47/44 514/23 |
| 5,858,941 | A | 1/1999 | Oakes et al. | |
| 5,919,745 | A | 7/1999 | Cala et al. | |
| 5,929,006 | A | 7/1999 | Saito et al. | |
| 5,968,893 | A | 10/1999 | Manohar et al. | |
| 5,986,118 | A | 11/1999 | Fehr et al. | |
| 5,998,358 | A | 12/1999 | Herdt et al. | |
| 6,004,922 | A | 12/1999 | Watson et al. | |
| 6,015,784 | A | 1/2000 | Kazuta et al. | |
| 6,190,502 | B1 | 2/2001 | Takeuchi et al. | |
| 6,225,485 | B1 | 5/2001 | Bertz et al. | |
| 6,262,013 | B1 | 7/2001 | Smith et al. | |
| 6,274,541 | B1 | 8/2001 | Man | |
| 6,290,732 | B1 | 9/2001 | Hei et al. | |
| 6,350,725 | B1 | 2/2002 | Levitt et al. | |
| 6,376,443 | B1 | 4/2002 | Julemont | |
| 6,384,003 | B1 | 5/2002 | Julemont | |
| 6,425,959 | B1 | 7/2002 | Man | |
| 6,436,887 | B1 | 8/2002 | Puckhaber et al. | |
| 6,479,453 | B2 | 11/2002 | Man | |

(Continued)

FOREIGN PATENT DOCUMENTS

| | | | |
|---|---|---|---|
| CA | 1 226 782 | A1 | 9/1987 |
| EP | 0 287 761 | A2 | 10/1988 |

(Continued)

OTHER PUBLICATIONS

Beggs (Tunnel Washers or Extractors: Whats the Proper Choice? (Part 1)) | American Laundry News, Jul. 22, 2006.*
Hickman WS. Peracetic acid nad its use in fiber bleaching. Rev. Prog. Color., 32 (2002) p. 13-27.*
Cai et al. Optimised chlorine-free bleaching systems for jute and jute/cotton blend fabrics. indian j. fiber text res, 23, (1998) 115.*
Beggs, "Tunnel Washer or Extractors: What's the Proper Choice? (Part 1 )" American Laundry News, Jul. 22, 2006.
Ecolab Safety Data Sheet Advacare Disinfectant, (Jan. 29, 2018).
Gurtler Industries, Inc., "Technical Service Report" Hibiclens® Antiseptic Skin Preparation (2008), http://www.regentmedical.com/americas/hibiclens_laundry.html.

(Continued)

*Primary Examiner* — Amina S Khan
(74) *Attorney, Agent, or Firm* — Merchant & Gould P.C.

(57) ABSTRACT

The present invention relates to a method of washing textile articles that can be carried out, for example, in a continuous batch tunnel washer. Embodiments of the present method can include treating the textile with an aqueous composition including cleaning agent and bleaching agent for a time sufficient to remove soil from the textile and contacting the halogen-treated textile with an aqueous composition including a peroxycarboxylic acid. The concentration of bleach after the sufficient time can be at a level that does not result in adverse interaction between the bleaching agent and the peroxycarboxylic acid.

19 Claims, No Drawings

(56) References Cited

U.S. PATENT DOCUMENTS

| | | | | |
|---|---|---|---|---|
| 6,608,015 | B2 * | 8/2003 | Busch | C11D 3/3942 510/311 |
| 6,716,805 | B1 | 4/2004 | Sherry et al. | |
| 6,897,188 | B2 | 5/2005 | Gohl et al. | |
| 6,903,060 | B1 | 6/2005 | Dykstra et al. | |
| 7,037,884 | B2 | 5/2006 | Man | |
| 7,098,181 | B2 | 8/2006 | Inoue et al. | |
| 7,307,055 | B2 | 12/2007 | Cook et al. | |
| 7,345,015 | B1 | 3/2008 | Kong et al. | |
| 7,414,017 | B2 | 8/2008 | Kong et al. | |
| 7,416,326 | B2 | 8/2008 | Sakata et al. | |
| 7,645,731 | B1 | 1/2010 | Silvernail et al. | |
| 7,723,281 | B1 | 5/2010 | Herdt et al. | |
| 7,825,079 | B2 | 11/2010 | Suzuki et al. | |
| 7,863,237 | B2 | 1/2011 | Rigley et al. | |
| 7,971,302 | B2 | 7/2011 | Poy et al. | |
| 7,998,278 | B2 | 8/2011 | Hackenberger et al. | |
| 8,287,658 | B2 | 10/2012 | Miralles et al. | |
| 8,361,950 | B2 | 1/2013 | Man et al. | |
| 8,513,178 | B2 | 8/2013 | Man et al. | |
| 8,569,220 | B2 | 10/2013 | Gaudreault | |
| 8,758,520 | B2 | 6/2014 | Monsrud et al. | |
| 9,670,438 | B2 | 6/2017 | Christensen et al. | |
| 9,719,051 | B2 | 8/2017 | Man et al. | |
| 10,253,281 | B2 * | 4/2019 | Berman | C11D 3/3951 |
| 10,995,305 | B2 * | 5/2021 | Berman | C11D 3/3945 |
| 11,773,350 | B2 * | 10/2023 | Berman | C11D 3/3951 8/137 |
| 2002/0151452 | A1 | 10/2002 | Bullock et al. | |
| 2002/0187910 | A1 * | 12/2002 | Speed | C11D 3/3942 510/303 |
| 2003/0195129 | A1 | 10/2003 | Ishikawa et al. | |
| 2003/0216273 | A1 | 11/2003 | Mitra et al. | |
| 2004/0028794 | A1 | 2/2004 | Van Buuren et al. | |
| 2004/0254090 | A1 | 12/2004 | Lentsch et al. | |
| 2005/0130870 | A1 | 6/2005 | Ochomogo et al. | |
| 2005/0153859 | A1 | 7/2005 | Gohl et al. | |
| 2006/0111261 | A1 | 5/2006 | Sadlowski et al. | |
| 2006/0205628 | A1 | 9/2006 | Deinhammer et al. | |
| 2006/0211593 | A1 | 9/2006 | Smith et al. | |
| 2007/0033702 | A1 | 2/2007 | Hsu | |
| 2008/0015133 | A1 | 1/2008 | Rigley et al. | |
| 2008/0276973 | A1 | 11/2008 | Miralles et al. | |
| 2009/0011971 | A1 | 1/2009 | Evers | |
| 2009/0119847 | A1 | 5/2009 | Arai et al. | |
| 2009/0264329 | A1 | 10/2009 | Underwood et al. | |
| 2010/0021557 | A1 * | 1/2010 | Li | A23B 5/14 562/2 |
| 2010/0170303 | A1 | 7/2010 | Gohl et al. | |
| 2010/0190676 | A1 | 7/2010 | Smith et al. | |
| 2010/0229897 | A1 | 9/2010 | Miralles et al. | |
| 2011/0107527 | A1 | 5/2011 | De Buzzaccarini et al. | |
| 2011/0112004 | A1 | 5/2011 | Smith et al. | |
| 2011/0123642 | A1 | 5/2011 | Wilmotte | |
| 2011/0251116 | A1 | 10/2011 | Aehle et al. | |
| 2011/0296626 | A1 | 12/2011 | Poy | |
| 2012/0023680 | A1 | 2/2012 | Poy et al. | |
| 2012/0066840 | A1 | 3/2012 | Man et al. | |
| 2012/0129751 | A1 | 5/2012 | Miracle et al. | |
| 2013/0104319 | A1 | 5/2013 | Man et al. | |
| 2013/0111675 | A1 | 5/2013 | Soontravanich et al. | |
| 2013/0192006 | A1 | 8/2013 | Tinker et al. | |
| 2014/0014137 | A1 | 1/2014 | Man et al. | |
| 2014/0165294 | A1 | 6/2014 | Wilker et al. | |
| 2014/0186922 | A1 | 7/2014 | Estell et al. | |
| 2014/0259440 | A1 | 9/2014 | Lock et al. | |
| 2014/0349372 | A1 | 11/2014 | Erlandsen et al. | |

FOREIGN PATENT DOCUMENTS

| | | | | |
|---|---|---|---|---|
| EP | 0 825 250 | A1 | 2/1998 | |
| EP | 1 026 226 | A1 | 9/2000 | |
| EP | 0 981 579 | B1 | 1/2004 | |
| EP | 1602765 | A1 * | 12/2005 | D06F 31/00 |
| JP | 63-190075 | A | 8/1988 | |
| JP | 63-283700 | A | 11/1988 | |
| JP | 04-185763 | A | 7/1992 | |
| JP | 11-229271 | A | 8/1999 | |
| JP | 2000-501449 | A | 2/2000 | |
| JP | 2000-219896 | A | 8/2000 | |
| JP | 2002-265996 | A | 9/2002 | |
| JP | 2003-306699 | A | 10/2003 | |
| JP | 2014-148641 | A | 8/2014 | |
| WO | 94/12610 | A1 | 6/1994 | |
| WO | 95/04128 | A1 | 2/1995 | |
| WO | 97/42289 | A1 | 11/1997 | |
| WO | 97/48785 | A2 | 12/1997 | |
| WO | 98/07654 | A1 | 2/1998 | |
| WO | 99/50380 | A1 | 10/1999 | |
| WO | WO-0105928 | A1 * | 1/2001 | C11D 11/0064 |
| WO | 2007/004622 | A1 | 1/2007 | |
| WO | 2008/008063 | A1 | 1/2008 | |
| WO | 2008/065109 | A1 | 6/2008 | |
| WO | 2011/033483 | A2 | 3/2011 | |
| WO | 2011/056935 | A1 | 5/2011 | |
| WO | 2012/036700 | A1 | 3/2012 | |
| WO | 2012/036703 | A1 | 3/2012 | |
| WO | 2013/032493 | A1 | 3/2013 | |

OTHER PUBLICATIONS

"Hazmat situation forces evacuation of Phoenix business," http://www.azfamily.com/story/28364613/hazmat-situation-forces-evacuation-of-phoenix-business, (2000).

Hlemenstine, "Mixing Bleach and Vinegar, Why You Shouldn't Mix Bleach and Vinegar and Why People Do It Anyway," ThoughtCo., (2018).

International Search Report and Written Opinion for PCT/US2013/055279 mailed Nov. 11, 2013.

International Search Report and Written Opinion, dated May 26, 2016, (PCT/US2016/012928).

Japanese Office Action for Application No. 2019-3452 mailed Jul. 6, 2021 (with English Translation), 17 pages.

"Lesson Learned—Accidental Mixing of Bleach and Acid," https://ehs.berkeley.edu/lessons-learned/lesson-learned-accidental-mixing-bleach-and-acid, Berkeley EH&S Office of Environment, Health & Safety (2018).

Süd-Chemie AG, "Tonsil® Highly Active Bleaching Earths", 10 pages.

* cited by examiner

METHOD OF WASHING TEXTILE ARTICLES

CROSS-REFERENCE TO RELATED APPLICATION

This application is a continuation application of U.S. application Ser. No. 17/220,193, filed Apr. 1, 2021, now U.S. Pat. No. 11,773,350, issued Oct. 3, 2023, which is a continuation application of U.S. application Ser. No. 16/280,249, filed Feb. 20, 2019, now U.S. Pat. No. 10,995,305, issued May 4, 2021, which is a continuation of Ser. No. 13/589,633, filed Aug. 20, 2012, now U.S. Pat. No. 10,253,281, issued Apr. 9, 2019, the disclosures of which are hereby incorporated by reference in their entirety.

FIELD OF THE INVENTION

The present invention relates to a method of washing textile articles that can be carried out, for example, in a continuous batch tunnel washer. Embodiments of the present method can include treating the textile with an aqueous composition including cleaning agent and halogen-containing bleaching agent for a time sufficient to remove soil from the textile and contacting the halogen-treated textile with an aqueous composition including a peroxycarboxylic acid. The concentration of halogen after the sufficient time can be at a level that does not result in adverse interaction between the halogen-containing bleaching agent and the peroxycarboxylic acid.

Embodiments of the present method can clean textiles with the results of more effective stain removal and less waste through destruction of the textile article. Further, the present invention can clean a textile contacted soiled by a composition including chlorhexidine gluconate without resulting staining of the textile, which staining could have been permanent.

BACKGROUND OF THE INVENTION

Commercial textile washing faces numerous challenges. For example, any batch of textile articles may include a variety of soils and stains, each of which will be washed with a single, unchanging set of detergents, bleaches, finishes and so on. In addition, the textile articles should be washed in a way that does not significantly decrease the useful life of the article. Harsh bleaching or washing conditions can shorten the useful life of a textile. And, it is cumbersome to inspect each article for cleanliness and residual stains. There remains a need to additional methods and compositions for commercial washing of textiles.

SUMMARY OF THE INVENTION

The present invention includes a method of cleaning textiles. This method can include treating the textile with an aqueous composition including cleaning agent and halogen-containing bleaching agent for a time sufficient to remove soil from the textile. After the sufficient time, the concentration of halogen can be below a level that would result in an unacceptable adverse interaction between the halogen-containing bleaching agent and the peroxycarboxylic acid. In an embodiment, the concentration of halogen after the sufficient time is less than about 30 ppm. The method can also include contacting the halogen-treated textile with an aqueous composition including a peroxycarboxylic acid.

The present invention includes a method of cleaning textile articles. This method can include providing a continuous tunnel washer having an interior, an intake, a discharge, and a plurality of sectors that divide the interior into a plurality of zones. This method includes moving the textile articles from the intake to a sector configured for treating the textile articles with an aqueous composition including cleaning agent and halogen-containing bleaching agent. This method includes treating the textile with an aqueous composition including cleaning agent and halogen-containing bleaching agent for a time sufficient to remove soil from the textile. After the sufficient time, the concentration of halogen can be below a level that would result in an unacceptable adverse interaction between the halogen-containing bleaching agent and the peroxycarboxylic acid. In an embodiment, the concentration of halogen after the sufficient time is less than about 30 ppm. This method includes transferring the textile articles to a sector configured for contacting the halogen-treated textile article with an aqueous composition including a peroxycarboxylic acid. The method can also include contacting the halogen-treated textile with an aqueous composition including a peroxycarboxylic acid.

In an embodiment, the present method washes textile articles and effectively removes stains from as many as or more than 99% of the washed articles. In an embodiment of the present method, only 1% of the articles washed are disposed of as rag (destroyed textile articles). In an embodiment, the present method can wash chlorhexidine gluconate from a textile article without resulting in a permanent or practically permanent stain on the article.

DETAILED DESCRIPTION OF THE INVENTION

The present invention relates to a method for cleaning textiles that results in more effective stain removal and in less waste through destruction of the textile article. The present invention also allows washing with both a halogen containing bleaching agent and a peroxycarboxylic acid oxidizer without unwanted adverse effects. Further, the present invention can clean a textile contacted soiled by a composition including chlorhexidine gluconate without resulting staining of the textile, which staining could have been permanent.

The present invention includes a method of cleaning a textile article. The method can include treating a textile with an aqueous composition including a cleaning agent and a halogen-containing (e.g., chlorine-containing) bleaching agent. The textile can be treated for a time effective for removing soil from the textile. According to the method, the concentration of halogen (e.g., chlorine) at the end of treating can be at a level that does not result in an unacceptable reaction with another oxidizer, such as a peroxycarboxylic acid. For example, at the end of treating the concentration of halogen can be less than about 30 ppm. The method can also include contacting the halogen-treated textile with an aqueous composition including a peroxycarboxylic acid.

The method of the present invention can be carried out in a continuous process. For example, the present method can be carried out in a continuous batch (tunnel) washer. The present treating can occur in one module or zone and the present contacting can occur in the next module or zone. In an embodiment of such a system, the textile article is not rinsed between treating and contacting. In an embodiment of such a system, the halogen-containing wash liquor is not (otherwise) removed from the textile article between treating and contacting. That is, the textile article can proceed directly from treating to contacting. Such a continuous process can include any of a variety of additional conventional modules or zones, for example, prewashing, rinsing, and/or finishing. In an embodiment, the present method is carried out without counterflow of the aqueous composition employed for contacting.

In an embodiment, the present invention includes a method of cleaning textiles. This embodiment includes: treating the textile with an aqueous composition including cleaning agent and halogen-containing bleaching agent for a time sufficient to remove soil from the textile; and contacting the halogen-treated textile with an aqueous composition including a peroxycarboxylic acid. By the start of contacting, or after the sufficient time, the concentration of halogen is less than about 30 ppm. During treating, e.g., at beginning of the sufficient time, the concentration of halogen can be about 50 to about 100 ppm. The halogen can be provided by any of a variety of bleaching agents, such as those described hereinbelow.

Treating can be conducted under any of a variety of conditions effective for removing soil from a textile article. For example, the temperature can be suitable for removing soil from a textile article in, for example, a continuous batch tunnel washer. In an embodiment, treating is conducted at a temperature effective to reduce the concentration of halogen to less than about 30 ppm during the sufficient time. Suitable temperatures for this embodiment include, about 140° F., about 145° F., about 140 to about 150° F., about 135 to about 155° F., or about 130 to about 160° F. In an embodiment, treating is conducted with an aqueous composition at a temperature of about 140° C. or about 150° F.

Treating can be carried out at any of a variety of pH levels suitable for soil removal. Before, treating the textile article can, optionally, have been washed with an alkaline cleaning composition. However, treating need not be conducted at an alkaline pH. For example, treating can be conducted at a neutral or slightly acid pH. In an embodiment, treating is conducted at a pH of about 9.5 to about 11.5, about 10 to about 11, about 10 (e.g., 10.2), about 11 (e.g., 10.8), or about 10.5 (e.g., 10.2, 10.8, 10.2-10.8).

According to the method, the concentration of halogen at the end of treating can be at a level that does not result in an unacceptable reaction with another oxidizer, such as a peroxycarboxylic acid. For example, at the end of treating the concentration of halogen can be less than about 50 ppm, less than about 40 ppm, less than about 30 ppm, less than about ppm, or less than about 10 ppm. In an embodiment, the concentration of halogen is less than about 30 ppm, about 30 ppm, or less than 30 ppm.

Contacting can employ any of a variety of peroxycarboxylic acid compositions, including known peroxycarboxylic acid compositions. Peroxycarboxylic acids are described in greater detail hereinbelow. In an embodiment, the peroxycarboxylic acid includes peroxyacetic acid. However, any of a variety of short or medium chain peroxycarboxylic acids may be employed, for example, peroxypropionic acid, peroxybutanoic acid, peroxypentanoic acid, peroxyoctanoic acid, and the like. In an embodiment, the peroxycarboxylic acid composition includes peroxyacetic acid, hydrogen peroxide, and acetic acid. Such a composition can have an acidic pH. In an embodiment, the use composition includes about 75 to about 85 ppm; about 70 to about 90 ppm; or about 60 to about 100 ppm peroxyacetic acid. In an embodiment, the use composition includes about 75 ppm; about 80 ppm; or about 85 ppm peroxyacetic acid.

In certain embodiments, the present method can be more effective than conventional methods for removing stains from textile articles, e.g., textile articles from a health care facility. In an embodiment, the present method removes stains from about 99% of textile articles treated and contacted. One method for handling articles that remain stained after an initial cleaning is to rewash the article. In an embodiment of the present method, the rate of rewash is significantly reduced. In an embodiment, only about 1% of textile articles treated and contacted require rewashing. In an embodiment, textile articles treated and contacted according to the present invention require rewashing at less than about 50% the rate of textile articles cleaned in a conventional process.

Whether or not a textile article is stained can be determined by any of a variety of accepted methods. For example, staining can be detected by visual inspection. For example, in an embodiment, a textile article is considered to be free of stains when it is suitable to be used again in a health care or hospitality environment. In an embodiment, the textile article can be described as like new in appearance. In an embodiment, free of stains means that the article has no visible stains. In an embodiment, for use in a surgical environment, a textile can be free of visible stains when examined on a light table.

In certain embodiments, the present method can be more effective than conventional methods for removing soil from textile articles without reducing articles to rag-stock. In an embodiment of the present method, only about 1% of textile articles treated and contacted are disposed of as rag. In an embodiment, textile articles treated and contacted according to the present invention are disposed of as rag at less than about 50% the rate of textile articles cleaned in a conventional process. Whether or not a textile article should be disposed of as rag can be determined by any of a variety of accepted methods. For example, rags can be detected by visual inspection. For example, in an embodiment, a textile article is judged to have been reduced to a rag when there is a visual discoloration on the textile article that is from a source other than manufacturing.

Any of a variety of textile articles can benefit from being washed according to the present method. Suitable textile articles include those from hospitality, health care, industrial, and food service facilities. In an embodiment, the textile cleaned by the present is a white textile article or a colored synthetic (e.g., polyester) textile article. In an embodiment, the textile is a white cotton textile article. In an embodiment the textile articles are from a health care facility. That is, the textiles are textile articles employed in health care. Such health care textile articles include, for example, a sheet, a towel, a patient gown, a bed spread, an incontinence pad, an operating room linen, a scrub, a wash cloth, a pillow case, or a mixture thereof.

Textile articles from a health care facility can have been contacted with hand sanitizers or other products that include chlorhexidine gluconate. Some conventional methods for cleaning textile articles that have been contacted with a composition that includes chlorhexidine gluconate can result in permanent (or for all practical purposes permanent) staining of this article. Articles that are permanently stained due to prior contact with chlorhexidine gluconate are generally not used again and may be disposed of. Advantageously, embodiments of the present method are effective for cleaning textiles that have previously been contacted with chlorhexidine gluconate without causing permanent or practically permanent staining.

The present method can include any of a variety of additional procedures employed in washing a textile article. For example, in an embodiment, the present method can include washing with an alkaline detergent (e.g., an alkaline aqueous use composition including surfactants and the like) before treating. In an embodiment, such washing employs a composition including alkaline detergent, optional water conditioner, and/or optional booster.

In an embodiment, the present method can include finishing with a finishing composition after contacting. Such an embodiment can employ a finishing composition including sour, softener, and one or more additional finishing compositions, such as starch, fluid repellant, mildicide, residual care agent, or mixture thereof. In an embodiment, the present method can employ a finishing composition lacking sour. Although not limiting to the present invention, it is believed that the acidity supplied by the peroxycarboxylic acid can eliminate the need for additional sour in the finishing composition.

In an embodiment, the present method includes washing with alkaline detergent before treating; and finishing with a finishing composition after contacting.

The present invention can be carried out in any of a variety of washing machines, for example, those employed in commercial laundry facilities. In an embodiment, the present method is carried out in a conventional washer/extractor machine in which a batch of laundry is subjected to all steps in a single tub. In an embodiment, the present method is carried out employing a continuous batch tunnel washer. In an embodiment, when employing a continuous batch tunnel washer, the method can be conducted without counterflow of the composition including a peroxycarboxylic acid.

Continuous Batch Tunnel Washer

In an embodiment, the present method is carried out employing a continuous batch tunnel washer. Continuous batch tunnel washers of a variety of configurations by a variety of manufacturers are known and can be employed in the present method. Suitable continuous batch tunnel washers include those described in U.S. Pat. Nos. 5,454,237 and 7,971,302 and in U.S. Patent Publications 20110296626 and 20120023680, the disclosures of which are incorporated herein by reference. Those washers that can employ counterflow need not employ that feature for embodiments of the present invention.

A suitable continuous batch washer can include multiple sectors, zones, stages, or modules including, for example, those for pre-wash, wash, rinse, and finishing. A method employing a continuous batch tunnel washer for washing textile articles can include, for example, moving the textile articles sequentially from one module or zone to the next module or zone including, for example, one or more prewash zones, one or more main wash zones, a pre-rinse zone, and then transferred to an extractor that performs the final rinse and that removes water. In an embodiment, such a method can include moving the textile articles from an intake of the washer to the discharge of the washer through one or more zones or sectors, which in certain embodiments can include first and second sectors that are a pre-wash zone.

Such a method can also employ a centrifugal extractor or mechanical press for removing most of the liquor from the goods before the goods are dried. In certain systems, if centrifugal extraction is used, it can be useful to rotate the extractor at a first low speed that is designed to remove soil laden water before a final extract.

In an embodiment, the present invention includes a method of cleaning textile articles including providing a continuous tunnel washer having an interior, an intake, a discharge, and a plurality of sectors that divide the interior into a plurality of zones. This method can include moving the textile articles from the intake to a sector configured for treating the textile articles with an aqueous composition including cleaning agent and halogen-containing bleaching agent. This method can also include treating the textile articles with an aqueous composition including cleaning agent and halogen-containing bleaching agent for a time sufficient to remove soil from the textile; the concentration of halogen being less than about ppm after the sufficient time. The method can include transferring the textile articles to a sector configured for contacting the halogen-treated textile article with an aqueous composition including a peroxycarboxylic acid. This method can also include contacting the halogen-treated textile article with an aqueous composition including a peroxycarboxylic acid.

This embodiment of the present method can be conducted without counterflow of the composition including a peroxycarboxylic acid. This method can include employing a concentration of halogen after the sufficient time of less than 30 ppm. This method can also include washing with alkaline detergent before treating. And, the method can also include finishing with a finishing composition after contacting.

An embodiment employing a tunnel washer can achieve advantageous level of stain-free textile articles. For example, in an embodiment, employing a tunnel washer stains are removed from about 99% of textile articles treated and contacted. In an embodiment, only about 1% of textile articles treated and contacted are disposed of as rag. In an embodiment, employing a tunnel washer, the method is effective to remove chlorhexidine gluconate from a textile article without leaving a stain produced from the chlorhexidine gluconate.

Washer/Extractor

The present method can be carried out in any of a variety of commercial textile washing machines. The continuous batch tunnel washer process has been described above. A washer/extractor machine operates batchwise rather than continuously. Textiles are place in the washer/extractor, water containing a first cleaning agent is added in an amount sufficient to wet the textiles, this water is drained, water containing a second cleaning agent is added in an amount sufficient to wet the textiles, and so on through the process to rinsing and extracting (e.g., spinning). In an embodiment, the present method employs a washer/extractor configured to pre-wash, wash, rinse, and finish textiles.

In an embodiment, the present invention includes a method of cleaning textile articles including providing a washer/extractor including a chamber for containing textiles. This method can also include treating the textile articles in the chamber with an aqueous composition including cleaning agent and halogen-containing bleaching agent for a time sufficient to remove soil from the textile; the concentration of halogen being less than about ppm after the sufficient time. This method can include removing this composition from the chamber. The method can include contacting the halogen-treated textile article with an aqueous composition including a peroxycarboxylic acid and removing this composition from the chamber. This method can also include washing with alkaline detergent before treating. And, the method can also include finishing with a finishing composition after contacting.

Bleaching Agent

Bleaching agents suitable for use in the present method for lightening or whitening a textile include bleaching compounds capable of liberating an active halogen species, such as $Cl_2$, $Br_2$, —$OCl^-$, and/or —$OBr^-$, under conditions typically employed in textile washing. Suitable bleaching agents for use in the present method include, for example, chlorine-containing compounds such as chlorines, hypochlorites, or chloramines. Suitable halogen-releasing compounds include, for example, an alkali metal dichloroisocyanurate, chlorinated trisodium phosphate, an alkali metal hypochlorite, monochloramine, and dichloramine. Encapsulated chlorine sources may also be used to enhance the stability of the chlorine source (see, for example, U.S. Pat. Nos. 4,618,914 and 4,830,773, the disclosures of which are incorporated by reference herein).

Suitable bleaching agents also include hydrogen peroxide, or other active oxygen species other than peracids.

Detergent

A detergent composition can include, for example, an effective amount of cleaning agent and an alkaline source to provide soil removal. The cleaning agent can include any component that provides soil removal properties when dispersed or dissolved in an aqueous solution and applied to a substrate for removal of soil from the substrate. The cleaning agent typically includes at least one surfactant, and a source of alkalinity. In certain embodiments, the cleaning agent preferably includes a surfactant or surfactant system, a source of alkalinity, a water conditioning agent, and an enzyme.

Peroxycarboxylic Acid

Peroxycarboxylic (or percarboxylic) acids generally have the formula $R(CO_3H)_n$, where, for example, R is an alkyl, arylalkyl, cycloalkyl, aromatic, or heterocyclic group, and n is one, two, or three, and named by prefixing the parent acid with peroxy. The R group can be saturated or unsaturated as well as substituted or unsubstituted. The methods of the invention can employ a peroxycarboxylic acid, such as, for example, peroxyacetic acid.

Peroxycarboxylic acids can be made by the direct action of an oxidizing agent on a carboxylic acid, by autoxidation of aldehydes, or from acid chlorides, and hydrides, or carboxylic anhydrides with hydrogen or sodium peroxide. In an embodiment, the percarboxylic acid can be made by the direct, acid catalyzed equilibrium action of hydrogen peroxide on the carboxylic acid. Scheme 1 illustrates an equilibrium between carboxylic acid and oxidizing agent (Ox) on one side and peroxycarboxylic acid and reduced oxidizing agent ($Ox_{red}$) on the other:

$$RCOOH+Ox \leftrightarrows RCOOOH+Ox_{red} \quad (1)$$

Scheme 2 illustrates an embodiment of the equilibrium of scheme 1 in which the oxidizing agent is hydrogen peroxide on one side and peroxycarboxylic acid and water on the other:

$$RCOOH+H_2O_2 \leftrightarrows RCOOOH+H_2O \quad (2)$$

In conventional peroxycarboxylic acid compositions it is believed that the equilibrium constant for the reaction illustrated in scheme 2 is about 2.5, which may reflect the equilibrium for acetic acid.

The alkyl backbones of peroxycarboxylic acids can be straight chain, branched, or a mixture thereof. Peroxy forms of carboxylic acids with more than one carboxylate moiety can have one or more of the carboxyl moieties present as peroxycarboxyl moieties.

Peroxyacetic (or peracetic) acid is a peroxycarboxylic acid having the formula of $CH_3COOOH$.

The composition of the present invention can include a carboxylic acid. Generally, carboxylic acids have the formula R—COOH wherein the R can represent any number of different groups including aliphatic groups, alicyclic groups, aromatic groups, heterocyclic groups, all of which can be saturated or unsaturated as well as substituted or unsubstituted. Carboxylic acids can have one, two, three, or more carboxyl groups.

In an embodiment, the compositions and methods include a peroxycarboxylic acid and the corresponding carboxylic acid.

Definitions

As used herein, weight percent (wt-%), percent by weight, % by weight, and the like are synonyms that refer to the concentration of a substance as the weight of that substance divided by the weight of the composition and multiplied by 100. Unless otherwise specified, the quantity of an ingredient refers to the quantity of active ingredient.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

The present invention may be better understood with reference to the following examples. These examples are intended to be representative of specific embodiments of the invention, and are not intended as limiting the scope of the invention.

EXAMPLES

Embodiments of the present method were subjected to extensive testing—16 weeks in four commercial tunnel washers. Textiles were washed in a wash liquor including 50 to 100 ppm chlorine followed by sanitizing with a composition including 70 to 90 ppm peroxyacetic acid in water. In certain tests, up to 120 ppm chlorine was used on articles with certain stains or soil exposure. The following results were obtained:

Textile Disposed of as Rag

| Site | CBW Wash Process With Conventional Chemistry (16 week rolling average) | Method of the Present Invention (Range) |
|---|---|---|
| 1 | 0.010 | 0.004 to 0.010 |
| 2 | 0.014 | 0.005 to 0.016 |
| 3 | 0.015 | 0.005 to 0.035 |
| 4 | 0.07 | 0.07 to 0.14 |

Percentage of Items that Required Rewashing

| Site | CBW Wash Process With Conventional Chemistry (16 week rolling average) | Method of the Present Invention (Range) |
|---|---|---|
| 1 | 2.8 | 0.7 to 1.5 |
| 2 | 2.4 | 1.0 to 2.3 |
| 3 | 2.4 | 0.9 to 2.0 |
| 4 | 8.1 | 3.0 to 7.0 |

The conventional chemistry employed in the CBW wash process was used conventional bleaching and washing chemistries, not the inventive halogen followed by peroxycarboxylic acid.

The standard for determining whether a textile should be disposed of as rag was a presence of a visual discoloration on the textile article that is from a source other than manufacturing.

The standard for determining whether a textile should be rewashed was whether the stain could be removed by treating with more concentrated chemistry.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

All publications and patent applications in this specification are indicative of the level of ordinary skill in the art to which this invention pertains.

The invention has been described with reference to various specific and preferred embodiments and techniques. However, it should be understood that many variations and modifications may be made while remaining within the spirit and scope of the invention.

We claim:

1. A method of cleaning textile articles, comprising:

placing a plurality of textile articles into a washer having a plurality of sectors including at least a first sector and a second sector;

treating the plurality of textile articles in the first sector with an aqueous composition comprising a bleaching agent and free from peroxycarboxylic acids; and treating the plurality of textile articles in the second sector with an aqueous composition comprising a peroxycarboxylic acid agent.

2. The method of claim 1, wherein the plurality of textile articles move through the washer in a first direction.

3. The method of claim 1, wherein the first sector has a pH of 9.5 to 11.5.

4. The method of claim 1, wherein the first sector has a temperature of 130° F. to 160° F.

5. The method of claim 1, wherein the concentration of the peroxycarboxylic acid agent in the second sector is less than 100 ppm.

6. The method of claim 1, wherein the second sector has an acidic pH.

7. The method of claim 1, wherein the bleaching agent is hydrogen peroxide.

8. The method of claim 1, wherein the bleaching agent is a halogen-containing bleaching agent.

9. The method of claim 1, wherein the method removes chlorhexidine gluconate without leaving a permanent stain in at least selected textiles where chlorhexidine gluconate is present.

10. The method of claim 1, wherein the plurality of textiles are treated in the first sector for a treatment time sufficient to remove soil from the textile.

11. The method of claim 1, wherein the bleaching agent is present in the first sector at an initial concentration from about 50 ppm to about 100 ppm.

12. The method of claim 1, wherein the plurality of textiles are treated in the first sector for a treatment time sufficient to reduce the concentration of bleaching agent to less than 50 ppm.

13. The method of claim 1, wherein the peroxycarboxylic acid agent is present in a concentration from about 60 ppm to about 100 ppm.

14. The method of claim 1, wherein the method of cleaning is carried out in a tunnel washer.

15. The method of claim 1, wherein the method of cleaning is carried out in a continuous tunnel washer.

16. The method of claim 1, wherein the first sector and the second sector are each in a different location in the washer.

17. The method of claim 1, further comprising the step of treating the plurality of textiles with a detergent.

18. The method of claim 17, wherein the detergent is an alkaline detergent.

19. The method of claim 1, further comprising treating with a sour after treating with the peroxycarboxylic acid agent.

* * * * *